(12) United States Patent
Kinoshita

(10) Patent No.: US 7,196,819 B2
(45) Date of Patent: Mar. 27, 2007

(54) IMAGE DATA CONVERSION APPARATUS, IMAGE DATA CONVERSION PROGRAM STORAGE MEDIUM, AND IMAGE DATA RE-CONVERSION PROGRAM STORAGE MEDIUM

(75) Inventor: Yoshiaki Kinoshita, Kanagawa (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 891 days.

(21) Appl. No.: 09/965,851

(22) Filed: Oct. 1, 2001

(65) Prior Publication Data

US 2002/0039191 A1 Apr. 4, 2002

(30) Foreign Application Priority Data

Sep. 29, 2000 (JP) .............................. 2000-299163

(51) Int. Cl.
*H04N 1/60* (2006.01)
(52) U.S. Cl. ........................................ 358/2.1; 358/504
(58) Field of Classification Search ................ 358/1.9, 358/2.1, 3.24, 504, 500–502, 516–524; 382/162–167; 347/23–24, 43, 115
See application file for complete search history.

(56) References Cited

U.S. PATENT DOCUMENTS

| | | | | |
|---|---|---|---|---|
| 6,012,792 | A | * | 1/2000 | Sievert et al. .................. 347/3 |
| 6,256,462 | B1 | * | 7/2001 | Maeda et al. .................. 399/71 |
| 6,343,847 | B1 | * | 2/2002 | Torpey et al. ................ 347/15 |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

In an image data conversion apparatus for converting input image data of four colors consisting of cyan, magenta, yellow and black into output image data, there is provided a detection section for detecting an existence of a point or an area on an image in which any one of cyan, magenta and yellow has a value exceeding a first predetermined value, and black has a value exceeding a second predetermined value, in accordance with the input image data, and a conversion section having two modes of a first mode wherein said input image data is converted into output image data which is independent of an existence of said detection section, and a second mode wherein in the event that the detection section detects an existence of the point or the area, the input image data is converted into an output image data which is representative of an existence of the point or the area.

9 Claims, 8 Drawing Sheets

CMYK

CMYK

CMYK

CMYK

IMAGE DATA CONVERSION APPARATUS, IMAGE DATA CONVERSION PROGRAM STORAGE MEDIUM, AND IMAGE DATA RE-CONVERSION PROGRAM STORAGE MEDIUM

BACKGROUND OF THE INVENTION

1. Field of the Invention

The present invention relates to an image data conversion apparatus for converting input image data for four colors consisting of cyan, magenta, yellow and black into output image data, an image data conversion program storage medium storing an image data conversion program which causes a computer to operate as such an image data conversion apparatus, and an image data re-conversion program storage medium.

2. Description of the Related Art

Hitherto, to perform a printing using a printing machine, in view of the fact that considerable work and cost are needed for operating the printing machine, there is adopted, prior to the printing, such a procedure that a color printer or the like is used to create a proof image in such a manner that the same finish of an image as much as possible can be obtained as compared with the finish of an image printed by the printing machine, and the printing is performed after an acceptable result is obtained on the proof image.

When it is intended to produce a printed matter wherein for example a secret portion of a document is masked with a black, or a portion of one's eyes is masked for the purpose of protection of one's privacy, an image of the portion to be masked is erased in such a manner that with respect to the portion on an image, of four colors of cyan (c), magenta (M), yellow (Y) and black (K), which are colors of ink to be used for printing, dot % for K is established with 100%, and dot % for C, M and Y is established with 0%. Thus, it is possible to obtain a printed matter in which the intended portion is masked. While the establishment of dot % for K with 100% makes it possible to implement the maximum density of the possible image density range on the printed matter, dot % for C, M and Y is established with 0% nevertheless. The reason why this is to do so is that in the event that an image of the portion to be masked is expressed by any of C, M and Y, when the masked portion is observed through reflection of light on the printed matter, there is a possibility that the masked portion appears in some extent in some reflection conditions of light.

To produce a proof image of an image including such a mask as mentioned above, let us consider a color printer for producing a proof image in such a manner that light sources for three colors of red (R), green (G) and blue (B) are used to expose a printing paper or the like to light.

In this case, image data consisting of four colors of C, M, Y and K is converted into image data consisting of three color of R, G and B, so that the color printer produces the proof image in accordance with the image data consisting of three color of R, G and B. A point or an area, in which the dot % of K on the image is 100%, offers the maximum density. Accordingly, even if any value is established for dot % of C, M and Y, it is converted into R=G=B=0 with which a black involved in the maximum density appears on the printing paper. Thus, even if images for C, M and Y are erased with respect to the masked portion, or alternatively even if an image for any one of C, M and Y appears on the masked portion owing to forgetting about erasing the images, the completely same proof image will be produced in both the cases.

For this reason, even if there is performed a printing upon confirmation of various check points on the proof image, forgetting about erasing the images for C, M and Y of the masked portion would make such a possibility that there is produced a printed matter in which not only ink for K 100% but also inks for C, M and Y are applied to the masked portion, so that a rough state of the image of the masked portion appears in some reflection conditions of light.

In this respect, there will be described more in detail in conjunction with drawings.

FIG. 7 is a view showing a color image of an original before masked. FIG. 8 is a view showing a monochromatic image wherein the color image of FIG. 7 is subjected to a color separation into monochromes of C, M, Y and K. FIG. 9 is a view showing a color image, wherein a portion of eyes of the color image of FIG. 7 is masked, which is intended to be finally obtained as a printed matter. Each of FIGS. 10 and 11 is a view showing a monochromatic image wherein the color image of FIG. 9 is subjected to a color separation into monochromes of C, M, Y and K. FIG. 10 shows separation images in which images of portions corresponding to the mask, of C, M and Y are not erased. FIG. 11 shows separation images in which images of portions corresponding to the mask, of C, M and Y are erased.

In the event that a color printer is used to produce a proof image, even if image data, in which images of the portions of the mask of C, M and Y are not erased, as shown in FIG. 10, is converted into image data for a color printer, it is possible to obtain the same image data as a case where image data, in which images of the portions of the mask of C, M and Y are erased, as shown in FIG. 11, is converted into image data for a color printer. Thus, when a proof image is outputted in accordance with image data thus obtained, it is possible to obtain a proof image, as shown in FIG. 9, in which images of C, M and Y of the portions of the mask do not appear at all.

FIG. 12 is a view showing a color image, which is printed in accordance with the image data corresponding to the separation image of FIG. 10. FIG. 13 is a view showing a color image, which is printed in accordance with the image data corresponding to the separation image of FIG. 11.

In the event that a printing is performed in accordance with image data, in which images of C, M and Y of the portions of the mask are inadvertently not erased, as shown in FIG. 10, it happens that images of C, M and Y of the portions of the mask appear in some reflection conditions of light on a printed matter, as shown in FIG. 12. Consequently, when a printing is performed, there is a need to perform the printing in accordance with the image data, in which images of C, M and Y of the portions of the mask are erased, as shown in FIG. 11, and thereby obtaining a printed matter completely free from vestiges of images of the portions of the mask, as shown in FIG. 13.

As it is, it cannot be recognized at all on the proof image that it is forgotten to erase images of C, M and Y of the portions of the mask. Thus, there is a possibility that a printed matter, which can be discriminated in the image of the portion of the mask, as shown in FIG. 12, is inadvertently produced in accordance with the image data, in which images of C, M and Y of the portions of the mask are inadvertently not erased, as shown in FIG. 10.

In this case, there is a need to do over again in producing a form plate in which images of C, M and Y of the portions of the mask are erased, and also to do over again in printing. This involves very large waste of labor and cost.

Further, in the event that such a defective printed mater is forwarded, there is a possibility that it involves a further large problem.

SUMMARY OF THE INVENTION

In view of the foregoing, it is an object of the present invention to provide an image data conversion apparatus, an image data conversion program storage medium storing an image data conversion program, and an image data re-conversion program storage medium, which are for performing conversion or re-conversion of image data in such a manner that the above-mentioned problems are prevented.

To achieve the above-mentioned object, the present invention provides an image data conversion apparatus for converting input image data of four colors consisting of cyan, magenta, yellow and black into output image data, said imager data conversion apparatus comprising:

a detection section for detecting an existence of a point or an area on an image in which any one of cyan, magenta and yellow has a value exceeding a first predetermined value, and black has a value exceeding a second predetermined value, in accordance with the input image data; and a conversion section having two modes of a first mode wherein said input image data is converted into output image data which is independent of an existence of said detection section, and a second mode wherein in the event that the detection section detects an existence of the point or the area, the input image data is converted into an output image data which is representative of an existence of the point or the area.

The image data conversion apparatus according to the present invention as mentioned above has the above-mentioned second mode as well as the first mode that is the conventional mode. Thus, the image data conversion apparatus is used for a conversion of image data for an output of a proof image, so that usually the image data is converted in the first mode to produce the proof image for confirmation of an image, and in case of an image having a mask, the image data is converted in the second mode to produce the image, and thereby confirming that an image of a portion of the mask is erased. Thus, according to the present invention, it is possible to prevent the above-mentioned defect.

In the image data conversion apparatus according to the present invention as mentioned above, it is preferable that when said detection section detects non-existence of the point or the area, said conversion section converts, in the second mode, the input image data into the same output image data as a case where the input image data is converted into the output image data in the first mode.

In this case, if the images for C, M and Y of the portion of the mask are erased, it is possible to use the image, which is produced in accordance with the image data converted in the second mode, as the usual proof image as it is.

Further, in the image data conversion apparatus according to the present invention as mentioned above, it is preferable that said detection section detects the existence of the point or the area together with position information on an image of the point or the area, and wherein when said detection section detects the existence of the point or the area, said conversion section converts, in the second mode, a fact that the point or the area exists into an output image data in which the position information on the image of the point or the area is involved.

In this case, it is acceptable that when said detection section detects the existence of the point or the area, said conversion section converts, in the second mode, a fact that the point or the area exists into an output image data in which the point or the area is represented by a predetermined color (for example, a gray).

This feature makes it easier and surer to confirm the existence of the point or the area.

Further, in the image data conversion apparatus according to the present invention as mentioned above, it is acceptable that said input image data is a multi-value of input image data, and said detection section detects an existence of the point or the area on the image in which any one of cyan, magenta and yellow has a value exceeding 0 as the first predetermined value, and black has a value exceeding 0 as the second predetermined value, in accordance with the input image data. In other words, according to the image data conversion apparatus according to the present invention, it is possible to adopt such a mode that there is detected an existence of the point or the area in which any one of cyan, magenta and yellow is not 0, and black is not 0.

Furthermore, in the image data conversion apparatus according to the present invention as mentioned above, it is acceptable that said input image data is a binary input image data consisting of 0 and 1, and said detection section detects an existence of the point or the area on the image in which any one of cyan, magenta and yellow has a value 1 exceeding 0 as the first predetermined value, and black has a value 1 exceeding 0 as the second predetermined value, in accordance with the input image data. In other words, according to the image data conversion apparatus according to the present invention, it is possible to adopt such a mode that there is detected an existence of the point or the area in which any one of cyan, magenta and yellow is 1 but not 0, and black is 1 but not 0.

To achieve the above-mentioned object, the present invention provides an image data conversion program storage medium storing an image data conversion program which causes a computer to operate as an image data conversion apparatus for converting input image data of four colors consisting of cyan, magenta, yellow and black into output image data, said imager data conversion program comprising:

a detection section for detecting an existence of a point or an area on an image in which any one of cyan, magenta and yellow has a value exceeding a first predetermined value, and black has a value exceeding a second predetermined value, in accordance with the input image data; and a conversion section having two modes of a first mode wherein said input image data is converted into output image data which is independent of an existence of said detection section, and a second mode wherein in the event that the detection section detects an existence of the point or the area, the input image data is converted into an output image data which is representative of an existence of the point or the area.

According to the image data conversion program storage medium of the present invention, when the image data conversion program stored therein is executed in a computer, the image data conversion program causes the computer to operate as the image data conversion apparatus of the present invention. This image data conversion program includes any types of programs, which cause the computer to operate as the image data conversion apparatus of the present invention.

To achieve the above-mentioned object, the present invention provides an image data re-conversion program storage medium storing an image data re-conversion program which causes a computer to operate as an image data re-conversion apparatus for re-converting input image data of four colors consisting of cyan, magenta, yellow and black into output image data, said imager data re-conversion program comprising:

a detection section for detecting an existence of a point or an area on an image in which any one of cyan, magenta and yellow has a value exceeding a first predetermined value, and black has a value exceeding a second predetermined value, in accordance with the input image data; and a re-conversion section having two modes of a first mode wherein said input image data is converted into output image data which is independent of an existence of said detection section, and a second mode wherein in the event that the detection section detects an existence of the point or the area, the input image data is re-converted into an output image data which is representative of an existence of the point or the area.

According to the image data re-conversion program storage medium of the present invention, when the image data re-conversion program stored therein is executed in a computer, the image data re-conversion program causes the computer to operate as the image data re-conversion apparatus of the present invention. This image data re-conversion program includes any types of programs, which cause the computer to operate as the image data re-conversion apparatus of the present invention.

Figure 9:
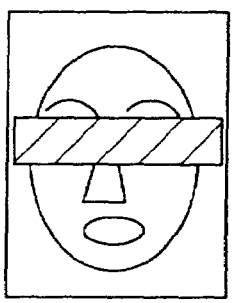
FIG. 9 is a view showing a color image, wherein a portion of eyes of the color image of FIG. 7 is masked, which is intended to be finally obtained as a printed matter.
Figure 10:
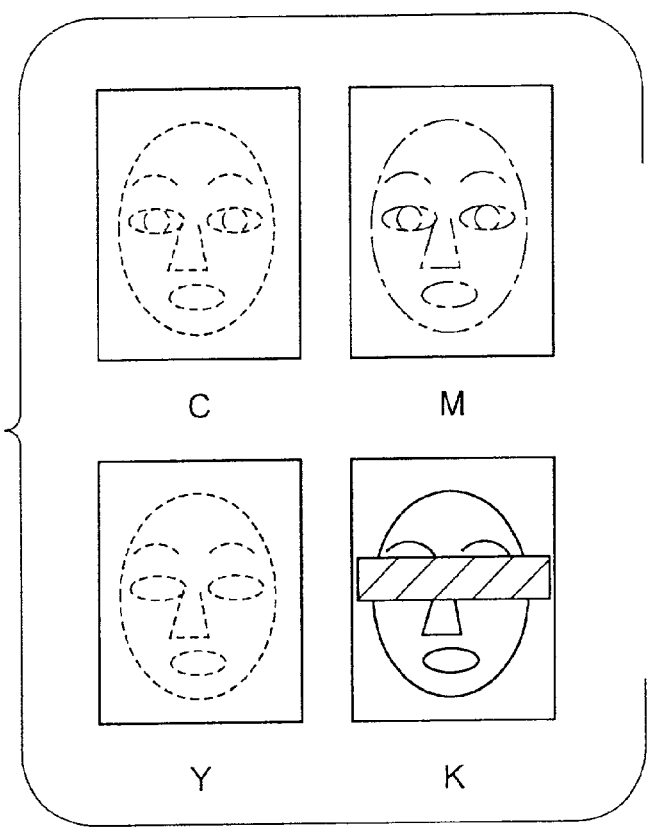
Figure 11:
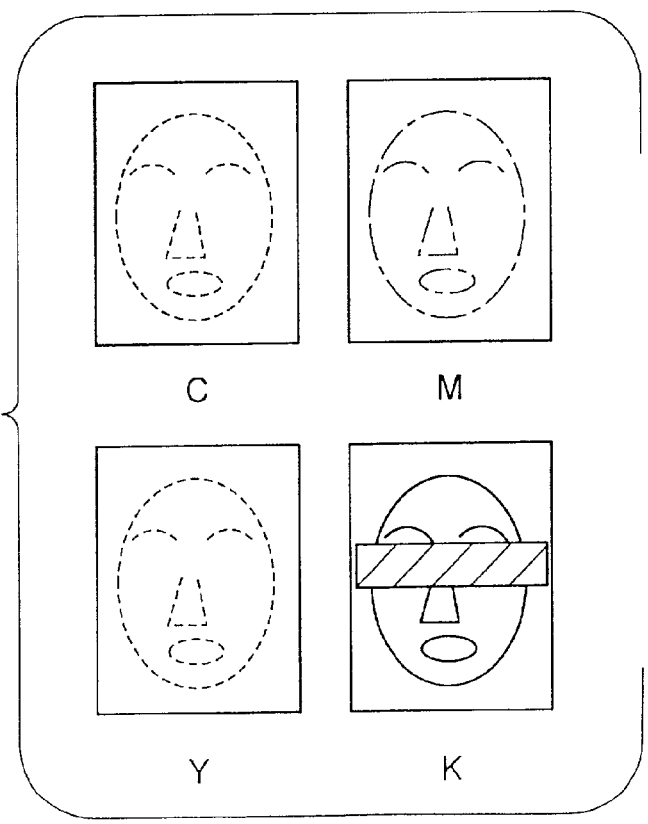

Each of FIGS. 10 and 11 is a view showing a monochromatic image wherein the color image of FIG. 9 is subjected to a color separation into monochromes of C, M, Y and K.

Figure 12:
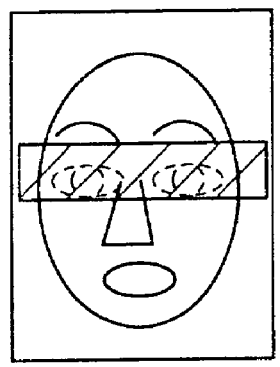

FIG. 12 is a view showing a color image, which is printed in accordance with the image data corresponding to the separation image of FIG. 10.

Figure 13:
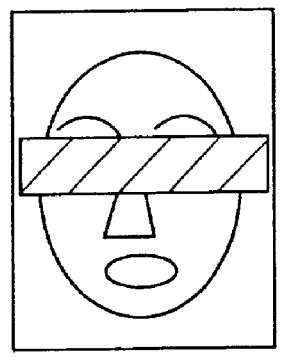

FIG. 13 is a view showing a color image, which is printed in accordance with the image data corresponding to the separation image of FIG. 11.

DETAILED DESCRIPTION OF PREFERRED EMBODIMENTS

Embodiments of the present invention will be described with reference to the accompanying drawings.

Figure 1:
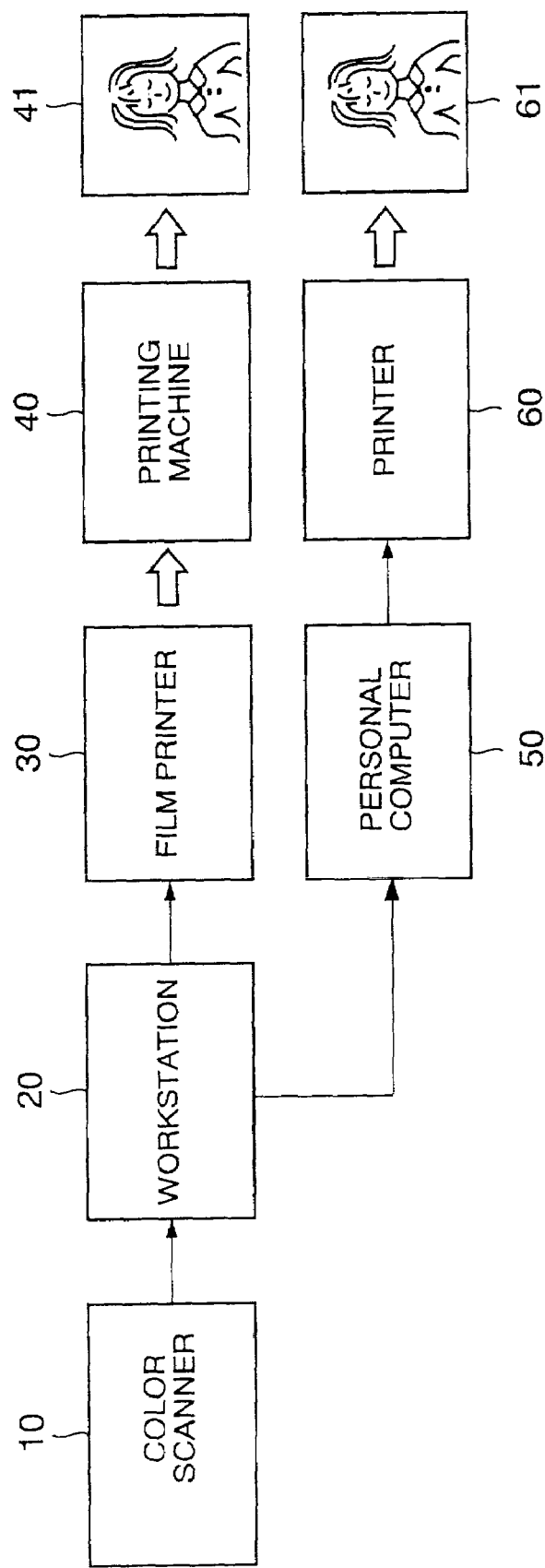
FIG. 1 is a schematic constitution view of a print and proof image creating system to which an embodiment of the present invention is applied.

FIG. 1 is a schematic constitution view of a print and proof image creating system to which an embodiment of the present invention is applied.

A color scanner 10 reads an original image and produces color separation image data of four colors of CMYK representative of the original image. The image data of four colors of CMYK is fed to a workstation 20. The workstation 20 performs an electronic page make-up in accordance with image data entered by an operator to create image data representative of an image for printing. The image data for printing is fed, in case of performing printing, to a film printer 30 so that print film original plates for CMYK plates are produced in accordance with the fed image data.

A machine plate is produced from the print film original plate and is mounted on a printing machine 40. Ink is applied to the machine plate mounted on the printing machine 40 and is transferred onto a sheet for print to form a printed image 41 on the sheet.

A series of work, in which the film printer 30 is used to produce the film original plate and further the machine plate, the produced machine plate is mounted on the printing machine 40, and ink is applied to the machine plate to perform a printing on a sheet, is large-scale works and takes a lot of cost. For this reason, before the actual printing works, a printer 60 is used to produce a proof image 61 in accordance with a manner as set forth below, so that a finish of the printed image 41 is confirmed beforehand.

When the proof image is produced, image data, which is created by the electronic page make-up on the workstation 20, is fed to a personal computer 50. Here, the image data fed to the personal computer 50 is description language data described in a so-called PDL (Page Description Language). The personal computer 50 converts the image data of the description language into image data of four colors of CMYK developed to a bit map by a so-called RIP (Raster Image Processor). The image data of four colors of CMYK is substantially the same as the image data for printing fed to the film printer 30.

The image data for printing of four colors of CMYK is converted into image data of three colors of RGB suitable for a printer 60 through referring to a color conversion definition having a format of LUT (Look Up Table) inside the personal computer 50. The printer 60 receives the image data for the printer of three colors of RGB and produces the proof image 61 in accordance with the image data for the printer of three colors of RGB.

In this manner, the proof image is produced and confirmed, so that the finish of printing is confirmed beforehand.

An aspect as an embodiment of the present invention in the proof image producing system shown in FIG. 1 resides in processing contents to be executed inside the personal computer 50. Hereinafter, there will be described the personal computer 50.

Figure 2:
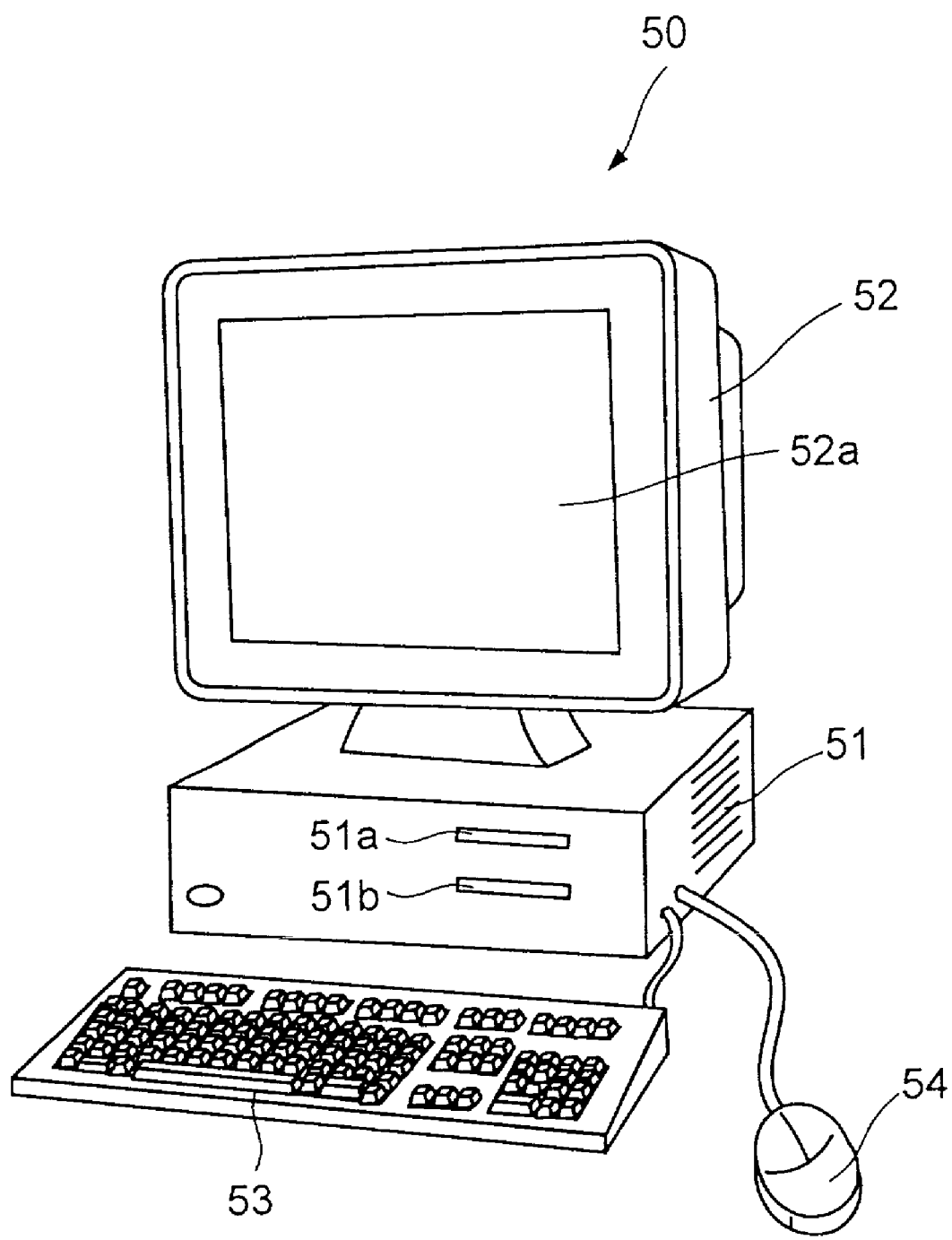
FIG. 2 is a perspective view of a personal computer, which is shown in FIG. 1 with a block.
Figure 3:
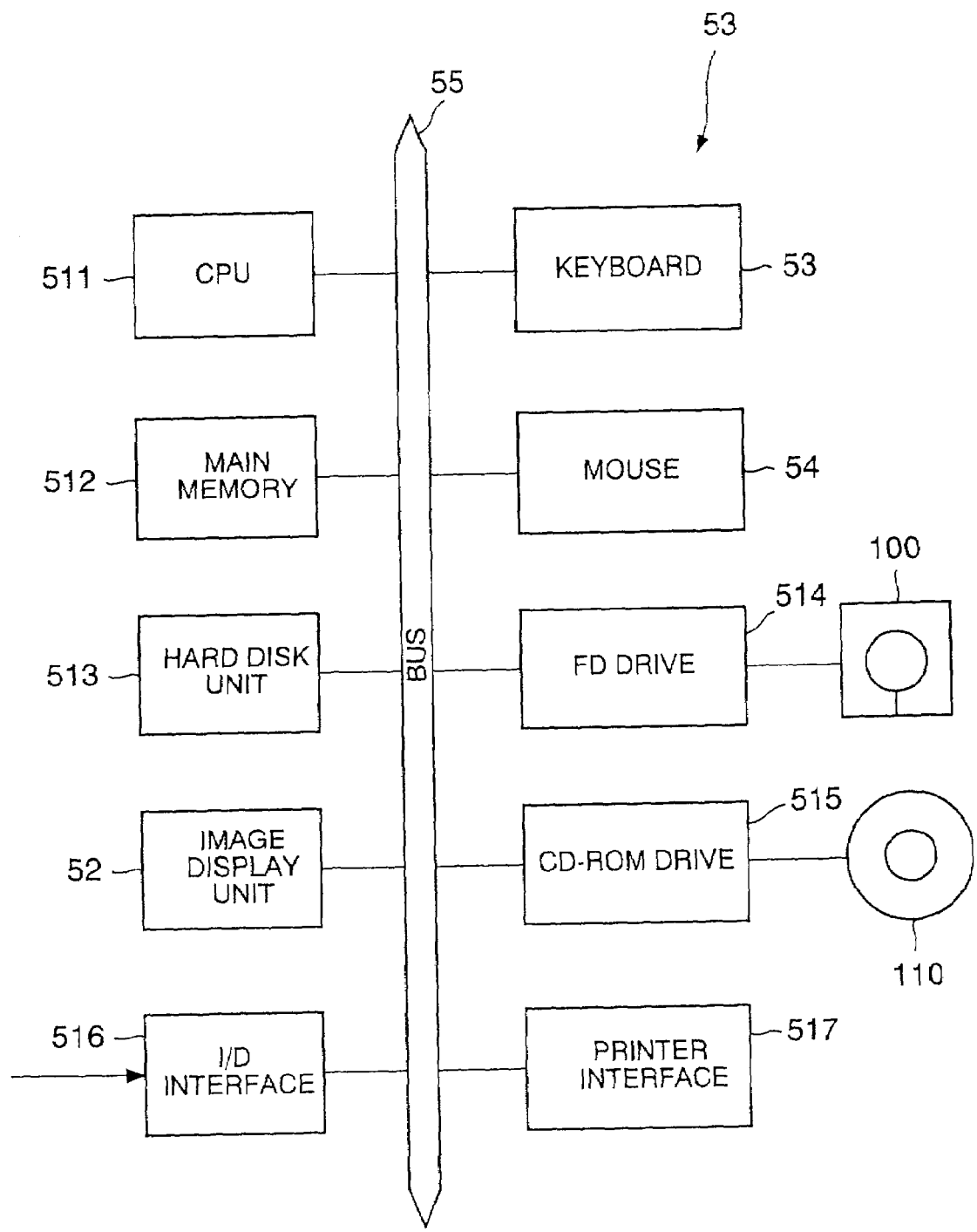
FIG. 3 is a hardware structural view of the personal computer.

FIG. 2 is a perspective view of the personal computer 50 shown in FIG. 1. FIG. 3 is a hardware structural view of the personal computer 50.

The personal computer 50 comprises, on an external appearance, a main frame unit 51, an image display unit 52 for displaying an image on a display screen 52a in accordance with an instruction from the main frame unit 51, a keyboard 53 for inputting various sorts of information to the main frame unit 51 in accordance with a key operation, and a mouse 54 for inputting an instruction according to, for example, an icon and the like, through designation of an optional position on the display screen 52a, the icon and the like being displayed on the position on the display screen 52a. The main frame unit 51 has a floppy disk mounting slot 51a for mounting a floppy disk, and a CD-ROM mounting slot 51b for mounting a CD-ROM.

The main frame unit 51 comprises, as shown in FIG. 3, a CPU 511 for executing a various types of program, a main memory 512 in which a program stored in a hard disk unit 513 is read out and developed for execution by the CPU 511, the hard disk unit 513 for saving various types of programs and data, an FD drive 514 for accessing a floppy disk 100 mounted thereon, a CD-ROM drive 515 for accessing a CD-ROM 110 mounted thereon, an I/O interface 516 connected to the workstation 20 (cf. FIG. 1), to receive image data from the workstation 20, and a printer interface 517 to transmit image data to the printer 60. These various types of elements are connected via a bus 55 to the image display unit 52, the keyboard 53 and the mouse 54.

The CD-ROM 110 stores therein an image data conversion program for causing the personal computer 50 to operate as an image data conversion apparatus. The CD-ROM 110 is mounted on the CD-ROM drive 515 so that the image data conversion program, which is stored in the CD-ROM 110, is up-loaded on the personal computer 50 and is stored in the hard disk unit 513.

When the embodiment of an image data conversion program of the present invention is stored in the CD-ROM 110, the CD-ROM 110 corresponds to the embodiment of an image data conversion program storage medium of the present invention. When the image data conversion program program of the present invention is up-loaded and stored in the hard disk unit 513, the hard disk unit 513 storing the image data conversion program also corresponds to the embodiment of an image data conversion program storage medium of the present invention. When the image data conversion program of the present invention is down-loaded onto the floppy disk 100, the floppy disk 100 storing the image data conversion program also corresponds to the embodiment of an image data conversion program storage medium of the present invention.

Figure 4:
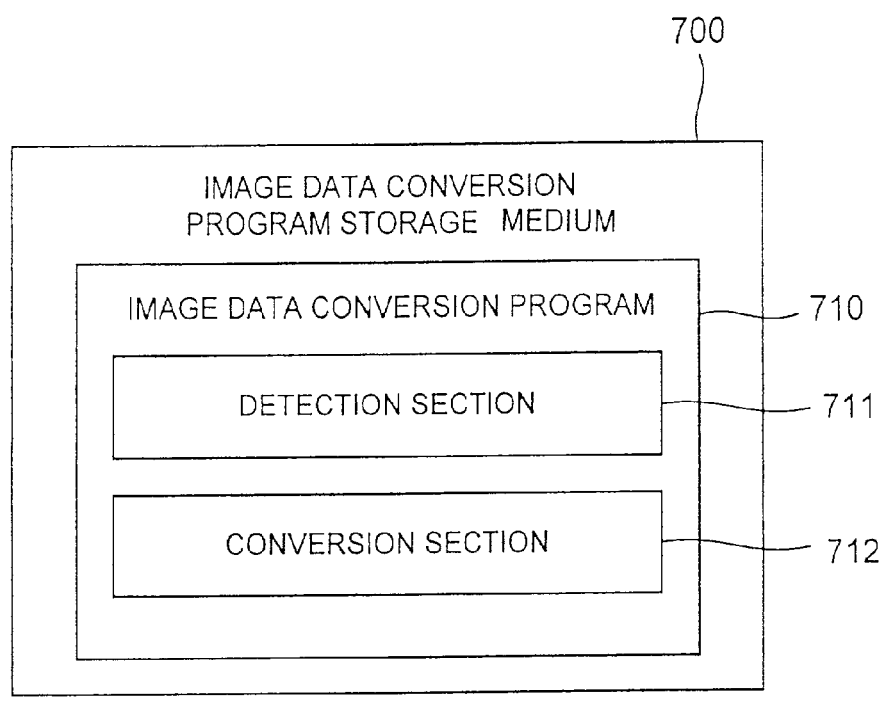
FIG. 4 is a structural view of an image data conversion program stored in an image data conversion program storage medium.

FIG. 4 is a structural view of an image data conversion program stored in an image data conversion program storage medium.

An image data conversion program storage medium 700 in FIG. 4 typically shows, in comparison with the structures shown in FIGS. 2 and 3, the CD-ROM 110, the floppy disk 100, or the hard disk unit 513, which store an image data conversion program 710. The image data conversion program 710 stored in the image data conversion program storage medium 700 comprises a detection section 711 and a conversion section 712.

The detection section 711 is a program component for detecting, when it is effected by the personal computer 50 shown in FIGS. 2 and 3, a pixel (hereinafter, it is referred to as a "unerased mask pixel") in which any one of C, M and Y has a value (C, M, Y>0) exceeding a first predetermined value (here 0), and K has a value (K>0) exceeding a second predetermined value (here 0), in accordance with input image data for CMYK four colors wherein image data described in PLD is fed to the personal computer 50 and is developed into a bit map in accordance with RIP.

The conversion section 712 is a program component for performing, when it is effected by the personal computer 50 shown in FIGS. 2 and 3, a conversion of an image data in such a manner that a mode is optionally selected between a first mode wherein the input image data for CMYK four colors are converted into image data for RGB three colors to output a proof image using the printer 60, regardless of the existence of the detection section 711, and a second mode wherein in the event that the detection section 711 detects the unerased mask pixel, the input image data for CMYK four colors are replaced by fixed values of R=G=B=50 with respect to the unerased mask pixel, and with respect to pixels other than the unerased mask pixel, the same conversion as the first mode is performed, and the conversion of the image data is performed in accordance with the selected mode.

Figure 5:
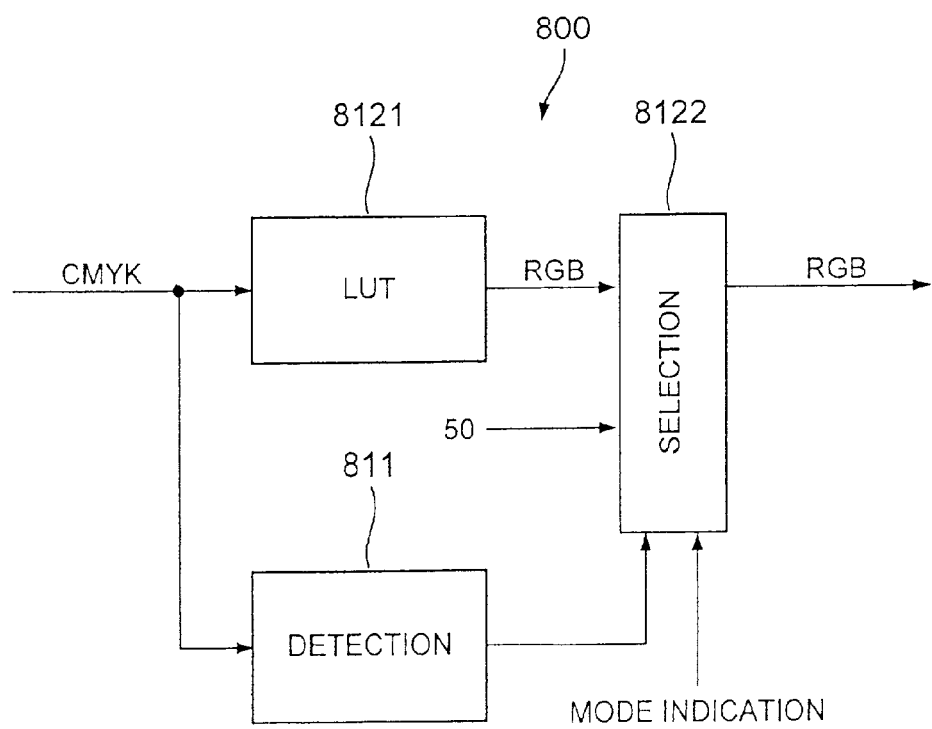
FIG. 5 is a functional block diagram of an image data conversion apparatus of the present invention.

FIG. 5 is a functional block diagram of an image data conversion apparatus of the present invention. An image data conversion apparatus 800 shown in FIG. 5 comprises the personal computer 50 shown in FIGS. 1, 2 and 3, and the image data conversion program 710 shown in FIG. 4, which is installed in the personal computer 50.

The image data conversion apparatus 800 converts into output image data for RGB three colors input image data for CMYK four colors wherein image data described in PLD language is developed into a bit map in accordance with RIP in the personal computer 50.

The image data conversion apparatus 800 comprises a detection section 811, a look-up-table 8121 and a selection section 8122. In comparison with the image data conversion program 710 shown in FIG. 4, the detection section 811 of the image data conversion apparatus 800 corresponds to the detection section 711 of the image data conversion apparatus 710. And the compound of the look-up-table 8121 and the selection section 8122 of the image data conversion apparatus 800 corresponds to the conversion section 712 of the image data conversion apparatus 710.

In the image data conversion apparatus 800 shown in FIG. 5, image data for CMYK four colors are sequentially fed for each pixel to both the look-up-table 8121 and the detection section 811.

The look-up-table 8121 stores therein a conversion table for converting image data for CMYK four colors into data for RGB three colors suitable for obtaining a proof image by the printer 60. Thus, the image data for CMYK four colors, which are fed to the look-up-table 8121, are sequentially converted for each pixel into image data for RGB three colors in accordance with the conversion table, and are fed to the selection section 8122.

On the other hand, the detection section 811 Detects pixels (the "unerased mask pixel"), in which any one of C, M and Y has a value (C, M, Y>0), and K has a value (K>0), on the image data for CMYK four colors. A result of detection is informed the selection section 8122.

Fed to the selection section 8122 is a mode indication for selectively indicating between the first mode and the second mode. When the mode indication indicates the first mode, the selection section 8122 outputs the image data for RGB three colors obtained in the look-up-table 8121 as it is, regardless of a result of the detection by the detection section 811.

On the other hand, when the mode indication indicates the second mode, the selection section 8122 outputs, in accordance with a result of the detection by the detection section 811, with respect to pixels other than the unerased mask pixel, the image data for RGB three colors obtained in the look-up-table 8121 as it is, in a similar fashion to that of the first mode, and with respect to the unerased mask pixel, outputs image data of R=G=B=50 representative of gray, instead of the image data for RGB three colors obtained in the look-up-table 8121.

Thus, the image data for RGB three colors outputted from the selection section 8122 is outputted from the personal computer 50 shown in FIG. 1 and is fed to the printer 60 to produce a proof image.

Here, in the event that image data for CMYK four colors inputted to the image data conversion apparatus 800 shown in FIG. 5 is one as shown in FIG. 11, and K of the portion of the mask is of the maximum density and images of portion of the mask for C, M and Y are erased, a proof image outputted from the printer 60 is, as shown in FIG. 9, an image in which the portion of the mask is concerned with maximum density. On the other hand, in the event that image data for CMYK four colors inputted to the image data conversion apparatus 800 shown in FIG. 5 is one as shown in FIG. 10, and images of portion of the mask for C, M and Y are not erased, a proof image outputted from the printer 60 is the same as FIG. 9 on the figure, but an image in which the portion of the mask is expressed by a gray.

Consequently, in case of the image involved in the mask, as a result of producing a proof image in accordance with the image data converted in the second mode, a discrimination as to whether the portion of the mask is expressed by the complete black or the gray, on the proof image, makes it possible to easily and surely confirm whether images of portion of the mask for C, M and Y are erased.

Incidentally, in the above explanation, there is raised an example in which when images of portion of the mask for C, M and Y are not erased, a proof image, in which the mask is expressed by a gray, is outputted. It is acceptable, however, that the mask is expressed by another color instead of a gray. Or alternatively, other than an expression by color, any one is acceptable, as an expressive way, which can identify it as a normal mask, for example, in such a way that a frame encircling the mask appears on the image through an image processing.

Further, according to the present embodiment as mentioned above, an expressive form of the mask on the proof image is altered, so that the existence of the pixels of the unerased mask and the position of the image are expressed. It is acceptable, however, that the pixels of the unerased mask exist on a proof image at the corner of the proof image or a predetermined area.

Next, there will be explained an embodiment of an image data re-conversion program storage medium according to the present invention.

Figure 6:
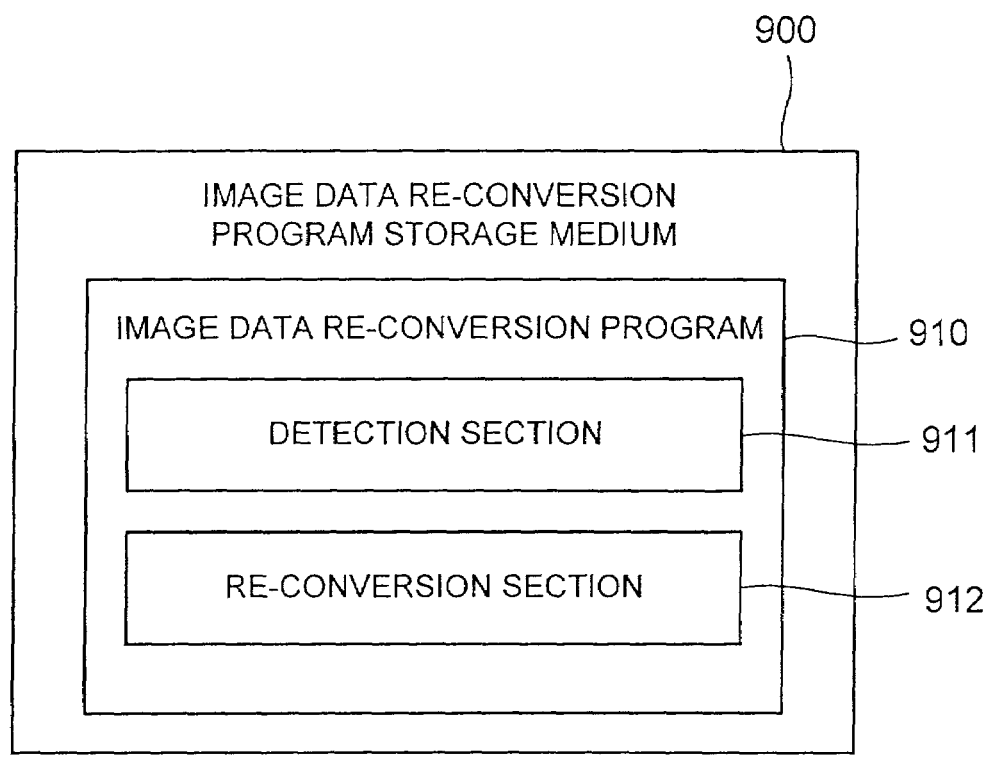
FIG. 6 is a structural view of an image data re-conversion program stored in an image data re-conversion program storage medium.
Figure 7:
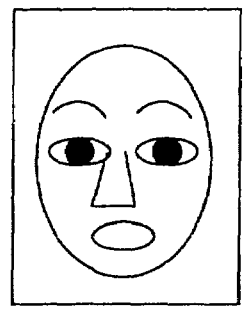
FIG. 7 is a view showing a color image of an original before masked.
Figure 8:
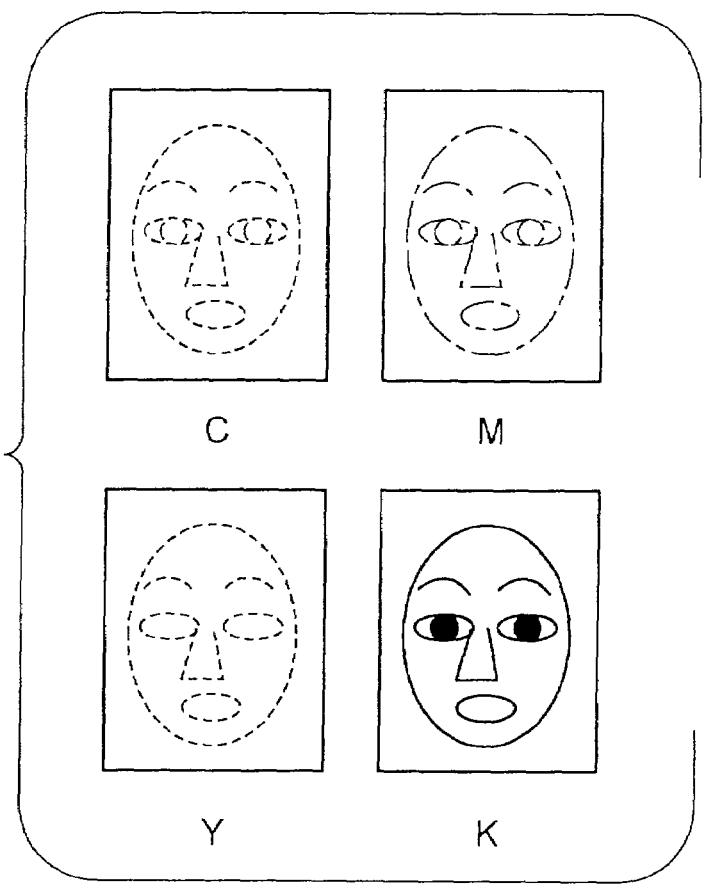
FIG. 8 is a view showing a monochromatic image wherein the color image of FIG. 7 is subjected to a color separation into monochromes of C, M, Y and K.

FIG. 6 is a structural view of an image data re-conversion program stored in an image data re-conversion program storage medium.

An image data re-conversion program storage medium 900 shown in FIG. 6 typically shows, in comparison with the structures shown in FIGS. 2 and 3, the CD-ROM 110, the floppy disk 100, or the hard disk unit 513, which store an image data re-conversion program 910, in a similar fashion to that of the image data conversion program storage medium 700 in FIG. 4.

The image data re-conversion program 910 stored in the image data re-conversion program storage medium 900 comprises a detection section 911 and a re-conversion section 912.

The detection section 911 has the same operations as the detection section 711 which is the program component constituting the image data conversion program storage medium 700 shown in FIG. 4. And thus the redundant explanation will be omitted.

The re-conversion section 912 is, in comparison with the image data conversion apparatus 800 shown in FIG. 5, a program component corresponding to the selection section 8122, and offers the operation of the selection section 8122 explained referring to FIG. 5, when the re-conversion section 912 is installed in the personal computer 50 (cf. FIGS. 1, 2 and 3) wherein an image data conversion program having the conventional image data conversion function (the image data conversion function by the look-up-table 8121 shown in FIG. 5) is already installed, and is effected. The redundant explanation will be omitted.

In this manner, it is acceptable that the image data re-conversion program 910 shown in FIG. 6 is incorporated into the personal computer having the conventional image data conversion function to implement the operation as an image data conversion apparatus of the present invention in combination with the conventional image data conversion function.

Incidentally, while the above-mentioned embodiments are, as explained referring to FIG. 5, to detect the unerased mask pixels for each pixel, there is always no need for the present invention to detect the unerased mask pixels for each pixel, and it is acceptable that an area corresponding to the unerased mask pixels, on the image, is detected for each area consisting of a plurality of pixels.

Further, while the above-mentioned embodiments relates to the examples in which as the image data consisting of four colors of C, M, Y and K, a multi-value of input image data is dealt with, the present invention is also applicable to a case where a binary image data is adopted as the input image data for each of C, M, Y and K.

In this case, with respect to all of C, M, Y and K, the input image data is expressed for each pixel by 0 representative of the absence of ink corresponding to the ink or 1 representative of the presence of ink corresponding to the ink. And, there is detected an area or a point wherein any one of C, M and Y is 1, and K is 1. When such an area or a point is detected, for example, values of RGB corresponding to the area or the point are converted into values representative of a gray.

As mentioned above, according to the present invention, in the event that images of C, M and Y of portion of the mask are inadvertently not erased, it is possible to detect such a defect at the stage of the proof image, and thereby avoiding such an inconvenience that the defect is only noticed, when a printing is performed.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image data conversion apparatus for converting input image data of four colors consisting of cyan, magenta, yellow and black into output image data, said image data conversion apparatus comprising:
   a detection section for detecting an existence of a point or an area on an image in which any one of cyan, magenta and yellow has a value exceeding a first predetermined value, and black has a value exceeding a second predetermined value, in accordance with the input image data; and
   a conversion section having two modes of a first mode wherein said input image data is converted into output image data which is independent of an existence of said detection section, and a second mode wherein in the event that the detection section detects an existence of the point or the area, the input image data is converted into an output image data which is representative of an existence of the point or the area;
   wherein when said detection section detects non-existence of the point or the area, said conversion section converts, in the second mode, the input image data into the same output image data as a case where the input image data is converted into the output image data in the first mode.

2. An image data conversion apparatus according to claim 1,
wherein said input image data is a multi-value of input image data, and said detection section detects an existence of the point or the area on the image in which any one of cyan, magenta and yellow has a value exceeding 0 as the first predetermined value, and black has a value exceeding 0 as the second predetermined value, in accordance with the input image data.

3. An image data conversion apparatus according to claim 1,
wherein said input image data is a binary input image data consisting of 0 and 1, and said detection section detects an existence of the point or the area on the image in which any one of cyan, magenta and yellow has a value 1 exceeding 0 as the first predetermined value, and black has a value 1 exceeding 0 as the second predetermined value, in accordance with the input image data.

4. An image data conversion apparatus for converting input image data of four colors consisting of cyan, magenta, yellow and black into output image data, said image data conversion apparatus comprising:
a detection section for detecting an existence of a point or an area on an image in which any one of cyan, magenta and yellow has a value exceeding a first predetermined value, and black has a value exceeding a second predetermined value, in accordance with the input image data; and
a conversion section having two modes of a first mode wherein said input image data is converted into output image data which is independent of an existence of said detection section, and a second mode wherein in the event that the detection section detects an existence of the point or the area, the input image data is converted into an output image data which is representative of an existence of the point or the area;
wherein said detection section detects the existence of the point or the area together with position information on an image of the point or the area, and
wherein when said detection section detects the existence of the point or the area, said conversion section converts, in the second mode, a fact that the point or the area exists into an output image data in which the position information on the image of the point or the area is involved.

5. An image data conversion apparatus according to claim 4, wherein when said detection section detects the existence of the point or the area, said conversion section converts, in the second mode, a fact that the point or the area exists into an output image data in which the point or the area is represented by a predetermined color.

6. A computer readable storage medium storing an image data conversion program which causes a computer to operate as an image data conversion apparatus for converting input image data of four colors consisting of cyan, magenta, yellow and black into output image data, said image data conversion program comprising:
a detection section for detecting an existence of a point or an area on an image in which any one of cyan, magenta and yellow has a value exceeding a first predetermined value, and black has a value exceeding a second predetermined value, in accordance with the input image data; and
a conversion section having two modes of a first mode wherein said input image data is converted into output image data which is independent of an existence of said detection section, and a second mode wherein in the event that the detection section detects an existence of the point or the area, the input image data is converted into an output image data which is representative of an existence of the point or the area,
wherein when said detection section detects non-existence of the point or the area, said conversion section converts, in the second mode, the input image data into the same output image data as a case where the input image data is converted into the output image data in the first mode.

7. A computer-readable storage medium storing an image data re-conversion program which causes a computer to operate as an image data re-conversion apparatus for re-converting input image data of four colors consisting of cyan, magenta, yellow and black into output image data, said image data re-conversion program comprising:
a detection section for detecting an existence of a point or an area on an image in which any one of cyan, magenta and yellow has a value exceeding a first predetermined value, and black has a value exceeding a second predetermined value, in accordance with the input image data; and
a re-conversion section having two modes of a first mode wherein said input image data is converted into output image data which is independent of an existence of said detection section, and a second mode wherein in the event that the detection section detects an existence of the point or the area, the input image data is re-converted into an output image data which is representative of an existence of the point or the area,
wherein when said detection section detects non-existence of the point or the area, said re-conversion section converts, in the second mode, the input image data into the same output image data as a case where the input image data is converted into the output image data in the first mode.

8. The apparatus of claim 1, An image data conversion apparatus for converting input image data of four colors consisting of cyan, magenta, yellow and black into output image data, said image data conversion apparatus comprising:
a detection section for detecting an existence of a point or an area on an image in which any one of cyan, magenta and yellow has a value exceeding a first predetermined value, and black has a value exceeding a second predetermined value, in accordance with the input image data; and
a conversion section having two modes of a first mode wherein said input image data is converted into output image data which is independent of an existence of said detection section, and a second mode wherein in the event that the detection section detects an existence of the point or the area, the input image data is converted into an output image data which is representative of an existence of the point or the area;
wherein in the second mode, the output image data corresponds to erasure of a portion of an image to be blacked out.

9. The apparatus of claim 8, wherein the output image data corresponds to output data of R=G=B=a predetermined value for erasure.

* * * * *